United States Patent
Forest et al.

(10) Patent No.: US 12,166,398 B2
(45) Date of Patent: Dec. 10, 2024

(54) DIRECT ENERGY CONVERTER FOR AXISYMMETRIC MIRROR FUSION REACTOR

(71) Applicant: Wisconsin Alumni Research Foundation, Madison, WI (US)

(72) Inventors: Cary Brett Forest, Madison, WI (US); Jeremiah Kirch, Waunakee, WI (US); Douglass A Endrizzi, Monona, WI (US); Jan Egedal, Cambridge, MA (US); Jay Anderson, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 17/654,920

(22) Filed: Mar. 15, 2022

(65) Prior Publication Data
US 2023/0298771 A1  Sep. 21, 2023

(51) Int. Cl.
*H02K 44/10* (2006.01)
*F03H 1/00* (2006.01)
*G21B 1/05* (2006.01)
*H05H 1/14* (2006.01)

(52) U.S. Cl.
CPC ........... *H02K 44/10* (2013.01); *F03H 1/0068* (2013.01); *G21B 1/05* (2013.01); *H05H 1/14* (2013.01)

(58) Field of Classification Search
CPC ........ H02K 44/08; H02K 44/10; H02K 44/12; H02K 44/16; H05H 1/14; G21B 1/05; G21B 1/21; G21D 7/00; G21D 7/02; F03H 1/0062; F03H 1/0068; F03H 1/0075

USPC ....... 376/121, 130, 139, 140, 143, 146, 147; 315/111.21, 111.31, 111.41; 313/243, 313/246; 310/10, 219

See application file for complete search history.

(56) References Cited

U.S. PATENT DOCUMENTS

| 3,397,330 A | * | 8/1968 | Hori | ...................... H02K 44/08 310/11 |
|---|---|---|---|---|
| 7,230,201 B1 | | 6/2007 | Miley et al. | |
| 10,996,310 B2 | | 5/2021 | Ng et al. | |

(Continued)

FOREIGN PATENT DOCUMENTS

| JP | 2016503474 A | 2/2016 |
|---|---|---|
| KR | 1020190127987 A | 11/2019 |

OTHER PUBLICATIONS

Kulcinski, G. L., J. F. Santarius, and Wisconsin Univ-Madison. "SOAR: Space Orbiting Advanced Fusion Power Reactor." UWFDM-722, Fusion Technology Institute (1987). (Year: 1987).*

(Continued)

*Primary Examiner* — Jack W Keith
*Assistant Examiner* — Jinney Kil
(74) *Attorney, Agent, or Firm* — Boyle Fredrickson, S.C.

(57) ABSTRACT

A direct converter for an axisymmetric mirror confinement system provides a set of radially symmetric vanes charged to capture ions escaping along the axis of the confinement system and to convert their energy to electrical power. An electron trap positioned before the charged vanes uses a magnetic field to divert and collect electrons, separating them from the ions, and may support a radial electric field providing plasma control. The charged vanes may be constructed of or have a coating of a getter material absorbing neutrals derived from those ions after capture.

14 Claims, 6 Drawing Sheets

(56) References Cited

U.S. PATENT DOCUMENTS

| | | | |
|---|---|---|---|
| 2013/0142296 A1 | 6/2013 | Piefer et al. | |
| 2013/0294558 A1* | 11/2013 | Schulte | G21B 1/05 376/147 |
| 2018/0106243 A1* | 4/2018 | Knoll | H02K 44/10 |
| 2019/0326029 A1 | 10/2019 | Piefer et al. | |
| 2020/0075179 A1 | 3/2020 | Tuszewski et al. | |
| 2020/0402677 A1 | 12/2020 | Cohen et al. | |

OTHER PUBLICATIONS

Fowler, T. K., R. W. Moir, and T. C. Simonen. "A new simpler way to obtain high fusion power gain in tandem mirrors." Nuclear Fusion 57.5 (2017): 056014. (Year: 2017).*
Carlson, G. A., et al. "Tandem mirror reactor with thermal barriers." Nuclear Engineering and Design 63.2 (1981): 233-250. (Year: 1981).*
Barr, William L., Ralph W. Moir, and Gordon W. Hamilton. "Experimental results from a beam direct converter at 100 kV." Journal of Fusion Energy 2 (1982): 131-143. (Year: 1982).*
Chitarin, Giuseppe, et al. "Concepts for the magnetic design of the MITICA neutral beam test facility ion accelerator." Review of Scientific Instruments 83.2 (2012). (Year: 2012).*
PCT/US2023/011606 International Search Report, May 24, 2023.
William L. Barr et al.;"A preliminary engineering design of a "Venetian blind" direct energy converter for fusion reactors." IEEE transactions on Plasma Science 2, No. 2 (1974): 71-92. US.

* cited by examiner

DIRECT ENERGY CONVERTER FOR AXISYMMETRIC MIRROR FUSION REACTOR

STATEMENT REGARDING FEDERALLY SPONSORED RESEARCH OR DEVELOPMENT

This invention was made with government support under DE-AR0001258 awarded by the DOE/ARPA-E. The government has certain rights in the invention.

CROSS REFERENCE TO RELATED APPLICATION

--

BACKGROUND OF THE INVENTION

The present invention relates to an apparatus for generating high-energy plasmas that can promote nuclear fusion and, in particular, to a direct energy converter for generating electrical energy from high-energy ions produced in a mirror fusion reactor.

High-temperature plasmas can be confined away from a physical container, avoiding damage to the container and possible plasma quenching, by a magnetic mirror confinement system. Such confinement systems may provide an axial magnetic field extending between two ends at which the magnetic flux lines converge. Plasma ions moving within this axial magnetic field spiral along the flux lines at the local cyclotron frequency and are "reflected" by an axial component of magnetic three acting on the spiraling ions. This reflecting magnetic force caused by the flux line convergence and concomitant increasing magnetic field strength is in the direction away from the convergence. Moreover, the reflecting three is proportional to the particle kinetic energy component which is perpendicular to the magnetic field. A similar reflecting force acts on the plasma electrons.

Nuclear fusion can be promoted in a magnetic mirror confinement system by generating plasma with sufficiently high energy and density. One method of reaching this high-energy/density state injects electrically neutral particles (a neutral beam) through the magnetic confinement field into the plasma where the neutral particles of the neutral beam are ionized, that is, split into plasma ions and electrons. The neutral beam has an initial energy above that necessary for fusion so that the resulting plasma ions maintain an energy suitable for fusion even with an expected collisional loss of energy of the plasma ions after introduction into the plasma. The plasma density and energy are determined by the loss rate of the fast ions injected by neutral beams which decreases with increasing beam energy; hence high energy ions are better confined than low energy ions.

Providing a neutral beam that can generate a sufficient flux of highly energetic particles at energies sufficient to maintain high fusion output in a magnetic mirror confinement system is difficult and costly from an energy standpoint. One method of offsetting this energy use is to perform a direct energy conversion of escaping ions into electrical power which may be used, for example, to provide electrical power for accelerating the articles of the neutral beam or other energy demands of the system.

SUMMARY OF THE INVENTION

The present invention provides a direct energy conversion system suitable for an axisymmetric mirror fusion system employing a radially symmetric structure matching the expansion cone of escaping protons and the recoil trajectory of those protons. The radial structure also supports the generation of a radial electrical bias for spin control of the plasma. The direct energy conversion system may also use a novel magnetic electron separator and plate getter material also having advantages for other types of fusion systems.

In one embodiment, the invention provides an apparatus for producing high-energy plasma including a magnetic mirror confinement field providing axially extending magnetic flux lines substantially radially symmetric about the axis and converging at opposed first and second ends of a confinement volume holding a plasma and a fuel beam delivery system for injecting fusion fuel into the confinement field. A direct energy converter is positioned along the axis outside of the magnetic mirror confinement field comprising multiple arrays of radially spaced apart charged plates separated by gaps aligned with trajectories of ions escaping from the magnetic mirror confinement field to generate electrical power therefrom.

It is thus a feature of at least one embodiment of the invention to providing high-efficiency direct energy conversion by aligning the plates with diverging ion trajectories so that a reduced impact profile is presented to high-energy ions that should not be intercepted by a given set of plates.

The charged plates maybe nested conical frustrums centered about the axis with cone apices directed toward the confinement volume.

It is thus a feature of at least one embodiment of the invention to provide a plate array providing high capture efficiency for conical trajectories of an axisymmetric fusion system.

The set of charged plates may provide an outer surface of a getter material, such as tantalum, for absorption of neutrals resulting from the captured ions.

It is thus a feature of at least one embodiment of the invention to improve the efficiency of direct energy conversion by reducing exchange losses when ions strike neutrals and possible arcing promoted by the presence of excess neutrals near the plates.

The plates may include cooling channels in thermal communication with the plates for cooling the plates.

It is thus a feature of at least one embodiment of the invention to support higher currents and, in some cases, provide a mechanism of plate temperature control, for example, to expel captured neutrals by allowing the plates to rise in temperature.

In some embodiments, the direct energy converter may include an electron separator comprised of a set of radially spaced magnetic elements positioned between the charged plates and the confinement volume, the magnetic elements having a spacing and axial length adapted to magnetically deflect electrons into the magnetic elements.

It is thus a feature of at least one embodiment of the invention to provide an improved electron separator taking advantage of the substantial mass difference between the ions and the electrons, and thus their Larmor radii, preferentially allowing capture of the electrons.

The spaced apart magnetic elements maybe ferromagnetic and magnetized by the axially extending magnetic flux lines of the magnetic mirror confinement field.

It is thus a feature of at least one embodiment of the invention to provide a simple structure that may be constructed of common material such as iron and make use of the existing magnetic environment.

The magnetic elements maybe electrically biased with respect to the charged plates to permit current flow between the charge plates and the magnetic elements.

The magnetic elements may be electrically biased with respect to each other by a controller altering the electrical bias to provide a radially directed electric field adapted for control of the plasma.

It is thus a feature of at least one embodiment of the invention to provide an electron separator operating without the need for an electrical bias for electron capture and thus well adapted to secondary use for plasma stability control.

These particular objects and advantages may apply to only some embodiments falling within the claims and thus do not define the scope of the invention.

DETAILED DESCRIPTION OF THE PREFERRED EMBODIMENT

I. Axisymmetric Mirror Fusion System

Figure 1:
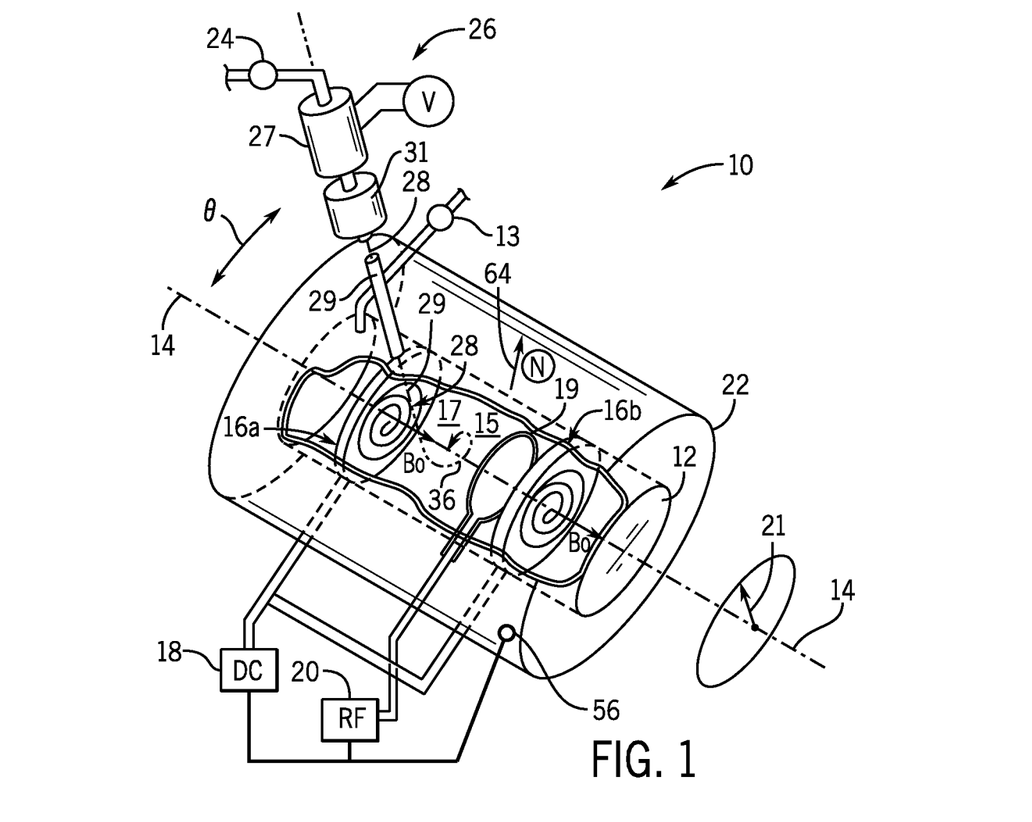
FIG. 1 is a perspective, cutaway view of a first embodiment of the invention providing a magnetic mirror confinement field, a neutral beam generator for directing beams into the confinement volume, and a radiofrequency generator producing an electric field acting on plasma ions from the neutron beam generator.

Referring now to FIG. 1, a high-energy plasma system 10 may provide a pressure vessel 12, for example, in the form of a sealed cylindrical shell of stainless steel or the like, extending along an axis 14 for receipt of a reaction gas, such as deuterium or tritium, through valve inlet assembly 13 from a pressure tank or the like (not shown).

First and second electromagnetic coils 16a and 16 may be positioned within the pressure vessel 12 near the opposed ends of the pressure vessel 12 to define a confinement volume 17 therebetween having a magnetic confinement field 15. The electromagnetic coils 16 are oriented and separated to form a Helmholtz pair aligned along axis 14 for establishing an axial $B_0$ field therebetween. In one embodiment, the electromagnetic coils 16 may be pancake coils providing spirals about axis 14 powered by an external, controllable DC power supply 18 of the type understood in the art.

Positioned between the electromagnetic coils 16 but proximate to one electromagnetic coil 16b is a radiofrequency antenna 19 (shown in simplified form), for example, providing a circularly polarized radio field extending along axis 14 when driven by a radiofrequency generator 20. As is understood in the art, the polarized radio field provides an electrical vector 21 perpendicular to axis 14 rotating thereabout. Further discussion of loop antennas suitable for this purpose are found in T. H. Stix, "Fast Wave Heating of a Two-Component Plasma," Nuclear Fusion 15, 737 (1975) and R. W. Harvey, M. G. McCoy, G. Kerbel, and S. C. Chiu, "ICRF Fusion Reactivity Enhancements in Tokamaks," Nuclear Fusion 26, 43 (1986) hereby incorporated by reference.

A treatment volume 22 may be located radially outside the pressure vessel 12, for example, in the form of a concentric outer cylindrical tank which may be filled with, for example, an aqueous material for transmutation by high-energy neutrons such as precursors to medical isotopes $^{99}$Mo (molybdenum 99), $^{131}$I (iodine 131), $^{133}$Xe (xenon 133), and $^{177}$Lu (lutetium 177), or which may support racks holding spent nuclear fuel rods being rejuvenated through transmutation by high-energy neutrons.

A neutral beam generator 26 is positioned to inject a beam 28 of neutral particles 29 (that is, non-ionized particles having zero net charge) at a pitch angle θ into the confinement volume 17. The pitch angle θ is defined as an acute angle between an angle of the beam 28 and the axis 14. The neutral particles 29, for example, are atoms of deuterium or tritium introduced through a gas line 24 and ionized by a local plasma (not shown). These ions are accelerated in an accelerator chamber 27 having a successive set of electrically charged plates as is generally understood in the art. The ions then pass through a neutralizing gas cell 31 to produce neutral particles 29 by a charge exchange process to produce the neutral particles 29 of the beam 28.

Figure 2:
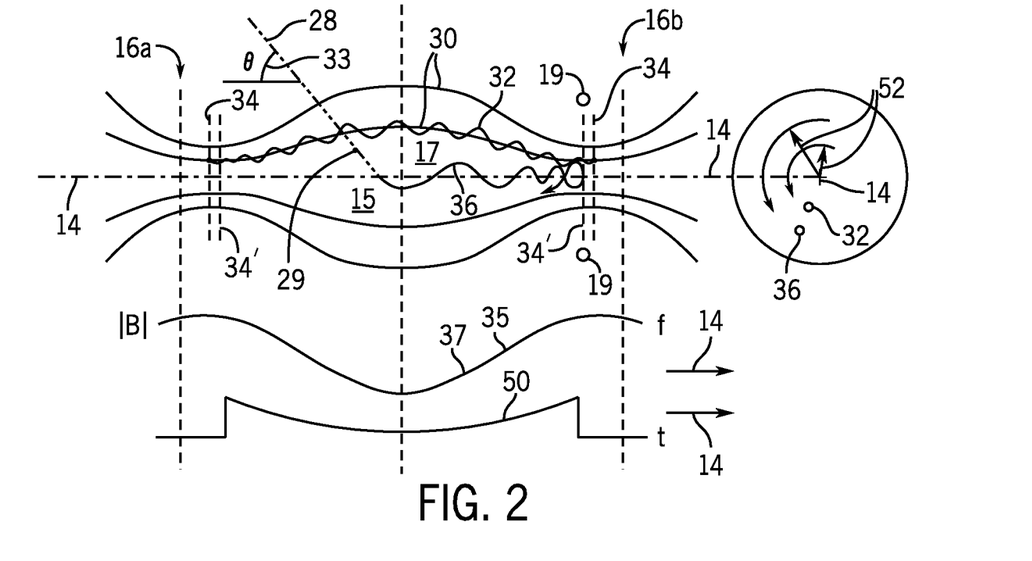
FIG. 2 is a side, elevational view of flux lines of the confinement volume of FIG. 1, aligned with an end view of those flux lines, both of these views showing trajectories of plasma ions of different energies, as well as graphs of cyclotron frequency, dwell time, and electric field strength as a function of axial distance.

Referring now also to FIG. 2, the flux lines of the magnetic field 30 (B) generated by the coils 16 will produce a "bottle" shape expanding radially from the axis 14 at a midpoint between the coils 16 and contracting radially at the location of the coils 16. As is generally understood in the art, this configuration produces a mirror confinement volume where randomly distributed "thermal" plasma ions of sufficient pitch angle 33 spiral around flux lines of the magnetic field 30 between regions defined by turning points 34.

These thermal plasma ions can be established in a variety of ways, for example, by using the radiofrequency antenna 19 (albeit at a low efficiency) or a separate heating system using high-frequency microwaves producing electron cyclotron resonance heating, as is understood in the art At the regions of the turning points 34, the thermal plasma ions 32 reverse direction caused by increasing axial components of the magnetic Lorentz force produced by the convergence of the flux lines of the magnetic field 30. The frequency 35 of the spiraling about the flux lines 30 is termed the "cyclotron frequency" and is a function of the strength of the magnetic field 37 along axis 14, and for this reason the cyclotron frequency 35 generally increases toward the electromagnetic coils 16. For ions of equal mass and charge, the cyclotron frequencies will be nominally identical at a given location along the axis 14, independent of the velocities or energies of the ions; however, ions 32 of equal mass having different pitch angles will normally have different turning points 34.

The velocity, and hence the energy of the neutral particles 29 of the neutral beam 28, and the pitch angle θ of the neutral beam 28 are set so the majority, for example, greater than 50 percent, of the particles of the neutral beam 28 will be ionized into plasma ions 36 within the confinement volume 17 before exiting the confinement field. These plasma ions 36 at the same pitch angle, now having an electrical charge, are captured by the magnetic flux lines 30 to increase the plasma density.

In order to promote this entrapment of the majority of the neutral particles 29 of the neutral beam 28, the energy of the neutral beam 28 is limited to provide sufficient time-of-flight for the neutral particles 29 to be ionized. Generally, the desirable energy of the neutral beam 28 for ionization will be well below the kinetic energy required for substantial fusion, and typically less than 100,000 electron volts or preferably less than 50,000 electron volts and more typically on the order of 15-25 keV. This is in contrast to prior art approaches which require neutral particles 29 with energies exceeding the energy necessary to promote fusion between the plasma ions 36 and typically having energies more than one million electron volts for D-D fusion. By limiting the energy of the neutral beam 28, a trade-off may be affected in common neutron beam generators 26 to produce a higher flux density of neutral particles 29, also increasing the plasma density.

Referring still to FIGS. 1 and 2, the pitch angle θ of the neutral beam 28 is selected to provide predetermined turning points 34' along axis 14 for the resulting plasma ions 36 and thus to provide a corresponding predetermined cyclotron frequency 35 of the plasma ions 36 at the turning points 34'. This cyclotron frequency is used to set the frequency of the radiofrequency generator 20 as will be discussed below.

In addition, the antenna 19 is placed proximate to one of the turning points 34' to provide a maximum field strength in that region.

Finally, within the energy levels for the neutral beam 28 that provide the desired capture of the neutral particles 29 within the confinement volume 17, the energy of the neutral beam 28 is set to be as high as possible so that the radius of orbit of the of the plasma ions 36 produced by the neutral beam 28 (gyro-orbit 52) is higher than the average distribution gyro-orbit 52 of "thermal ions" 32, being ions not immediately derived from the neutral beam 28.

While the inventors do not wish to be bound by a particular theory, the above-described (a) setting of the cyclotron frequency of the radiofrequency generator 20 to a harmonic of the cyclotron frequency of the plasma ions 36 at the turning point 34', (b) boosting of the energy of the plasma ions 36 above the average distribution of the thermal plasma ions 32, and (c) maximizing the electrical field strength at the turning point 34', all work together to allow the radiofrequency generator 20 to preferentially boost the energy of the plasma ions 36 from the neutral beam 28 free from the damping effect of thermal plasma ions 32.

In this regard, the setting of the radiofrequency generator 20 (per (a)) provides preferential coupling to the plasma ions 36 having a matching (e.g., a harmonically related) cyclotron frequency 35, in contrast to thermal plasma ions 32 having a range of different Doppler-shifted cyclotron frequencies and less effective coupling. The coupling may be proportional to the square of the Bessel function $B_{n-1}(\kappa_\perp * v_\perp/\omega_{ci})$ where:

n is the resonant cyclotron harmonic number of the injected wave, $\kappa_\perp$ is the perpendicular wave number; and $\omega_{ci}$ is the cyclotron frequency of the resonance ions.

The quantity $\kappa_\psi/\omega_{ci}$ may be $\sim v_A$, the Alfven velocity of the ions (cf. T. H. Stix, "Fast Wave Heating of a Two-Component Plasma," Nuclear Fusion 15, 37 (1975)). Given the dependence of the Bessel function on $v_\perp$, the coupling is proportional to powers of the perpendicular velocity of the ions and can be adjusted to preferentially dampen hot tail ions from the neutral beam and on those diffused to higher energy by the radiofrequency waves.

Further, by setting the frequency of the radiofrequency generator 20 according to the cyclotron frequency 35 at the turning point 34', the influence of the electrical field from the radiofrequency generator 20 on the plasma ions 36 is increased because of the prolonged dwell time 50 of the plasma ions 36 at the turning point 34' during their lowest axial velocity as they turn around. This is in contrast, for example, to thermal plasma ions 32 which move quickly through this zone to further turning points 34 or which do not reach as far as the turning point 34'.

As noted above, by boosting the energy of the plasma ions 36 above the distribution of thermal plasma ions 32 (per (b)) and by setting the radiofrequency generator 20 to an RF frequency which is a high harmonic of the cyclotron frequency 35 of the plasma ions 36, higher energy plasma ions 36 having a higher radius of gyro-orbit 52 preferentially absorb power over the thermal plasma ions 32 having a lower gyro-orbit 52. In some embodiments, the RF frequency may be set to a range from 20 to 100 megahertz and/or to a harmonic n greater than n=2 and preferably n=4.

Generally, the higher harmonics boost the relationship between energy absorption and gyro-orbit 52 according to increasing Bessel function numbers associated with those harmonics. Specifically, energy absorption will be proportional to $J_{n-1}(\kappa_\perp \rho)$ where: $J_{n-1}$ is the Bessel coefficient for a given harmonic n, ρ is the radius of the particle's gyro-orbit 52 about the magnetic flux lines 30 which increases with energy by $$\rho = \frac{\sqrt{2mE}}{eB},$$

and $\kappa_\perp$ is a wave number of the plasma ions 36 being a property of the wave within the plasma and the polarization of the antenna 19 launching the wave.

It will be appreciated that this effective preferential absorption of energy by the plasma ions 36 will be self-reinforcing as energy is absorbed and the gyro-orbit of the plasma ions 36 is increased.

Finally, by placing a highest field strength of the antenna 19 near the turning point 34', the plasma ions 36 are preferentially influenced.

Generally, the magnetic confinement field 15 will tend to lose some plasma ions 32 having low pitch angles through its ends. These particles are said to be in the "loss cone." By boosting the population of the plasma ions 36 having a known pitch angle θ outside of the loss cone, increased plasma densities can be obtained.

While the cyclotron frequency of the plasma ions 36 near the turning point 34', and hence the desired setting of the frequency of the radiofrequency generator 20, is primarily a function of the vacuum magnetic field strength of the magnetic field 37, it will shift slightly as a function of increasing plasma density/pressure. Accordingly, the invention contemplates that either or both of the DC power supply 18 and/or the radiofrequency generator 20 may be adjusted during operation to maintain the above relationships which boosts energy transfer to the plasma ions 36. In particular, this adjustment may be made via a closed-loop feedback control using a sensor 56 detecting plasma pressure, for example, using a diamagnetic loop, which will measure the decrease in magnetic field due to increased plasma pressure to ensure a matching of the excitation frequency of the radiofrequency generator 20 with the actual and dynamic cyclotron frequency 35 at the turning point 34'. To the extent that the cyclotron frequency is dictated by the total field (vacuum field from coil plus plasma diamagnetism), the invention also contemplates that no frequency change may be required, but the location of the turning point will move closer to the electromagnetic mirror coil.

Figure 3:
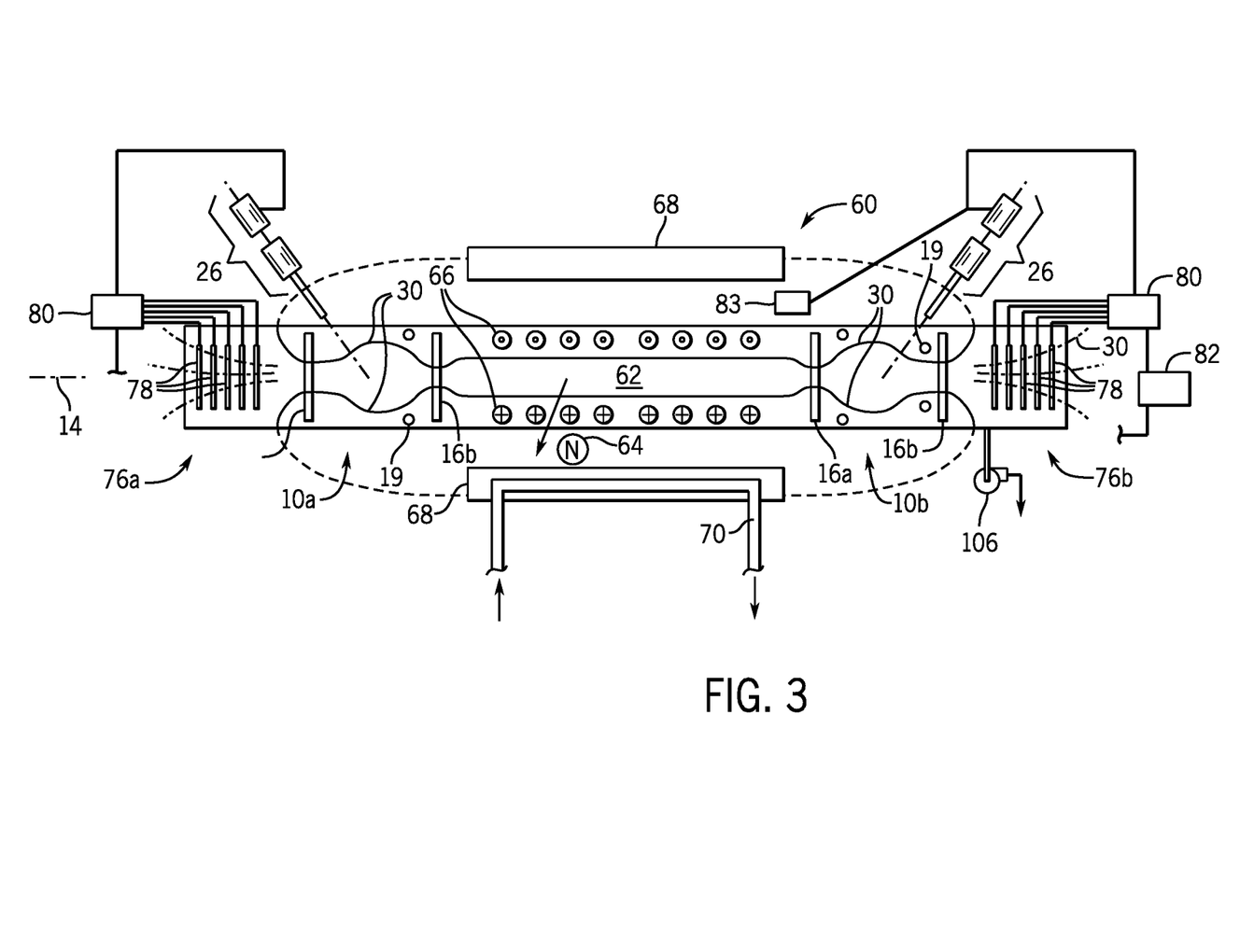
FIG. 3 is a simplified elevational cross-section of a fusion apparatus employing the magnetic mirror confinement fields of FIG. 1 as plugs blocking the escape of high-energy plasma ions from the central solenoidal magnetic field cell and providing direct energy converters per the present invention.

Referring now to FIG. 3, this benefit of the present invention in providing high plasma densities makes it useful as part of a tandem mirror neutron generator 60 where two high-energy plasma systems 10 may act as "plugs" to trap high-energy plasma ions in a larger scale tandem mirror neutron generator 60 for the purpose of transmutation (as discussed above) or fusion power generation. Such a design, for example, may make use of a tandem mirror scheme, for example, described at G. Dimov, V. Zakaidakov, and M. Kishinevski, Fiz. Plazmy 2 597 (1976), [Sov. J. Plasma], Phys 2, 326 (1976)] and T. K. Fowler and B. G. Logan, Comments on Plasma Physics and Controlled Fusion 2, 167 (1977) and hereby incorporated by reference.

More specifically, in such a tandem mirror neutron generator 60, first and second high-energy plasma systems 10*a* and 10*b* are placed in opposition along axis 14 flanking a generator volume 62. Generally, the high-energy plasma systems 10 will have an axial length on the order of 2 meter whereas the generating volume 62 will be much larger, for example, on the order of 50 meters or more.

The electromagnetic coils 16 of both of the high-energy plasma systems 10*a* and 10*b* are axially aligned to provide a same direction of polarization of the magnetic field along the common axis 14. As such, the flux lines 30 of the first high-energy plasma system 10*a* may continue through the volume 62 to the second high-energy plasma system 10*b*. Within the volume 62, the flux lines 30 are focused by an axially extending solenoid coil 66 circling the axis 14 around the volume 62.

For this purpose, the electromagnetic coils 16 may be superconducting magnets, for example, per Whyte, J. Minervini, B. LaBombard, E. Marmar, L. Bromberg, and M. Greenwald, "Smaller and sooner: Exploiting high magnetic fields from new superconductors for a more attractive fusion energy development path," Journal of Fusion Energy, 35, 41 (2016) also hereby incorporated by reference.

A subset of thermal plasma ions 32, having a uniform distribution of pitch angles and having been boosted to higher energies by kinetic transfer from the plasma ions 36, may escape from the high-energy plasma systems 10 into the volume 62 containing a reactant gas, for example, deuterium or tritium, to promote fusion and the emission of neutrons 64 from the volume 62. The high pressure of the high-energy plasma systems 10 blocks the escape of high-energy-plasma ions from the volume 62 to maintain the high densities for significant fusion.

The volume 62 may be surrounded by a treatment volume 22 which may include a heat exchanger liquid 68, for example, for receiving, through one or more heat exchangers, a working fluid 70 of a thermodynamic engine such as a turbine or the like, for example, for the generation of electrical power. Alternatively, the treatment volume 22 may be used for the transmutation of materials to generate medical isotopes or to rejuvenate spent nuclear fuel as discussed above.

A system providing the axisymmetric mirror fusion apparatus described above is disclosed in U.S. Pat. No. 10,966,310 entitled "high-energy plasma generator using radiofrequency and neutral beam power" assigned to the assignee of the present invention and hereby incorporated by reference. The present application also incorporates disclosure of US patent application 2019/0326029 entitled: Apparatus and Method for Generating Medical Isotopes, and US application 2013/0142296 entitled: Apparatus and Method for Generating Medical Isotopes which describe additional techniques for managing isotope transmutation including the use of neutron multiplier generators and other construction details and mechanisms for producing a neutral beam discussed above.

II. Direct Energy Converter

Referring still to FIG. 3, direct energy converters 76*a* and 76*b* may be placed along the axis 14 outside of the first and second high-energy plasma systems 10*a* and 10*b*, respectively, with respect to the generator volume 62. These direct energy converters 76 receive continuations of the flux lines 30 through a volume holding sets of axially perpendicular and axially separated plate arrays 78. As a nonlimiting example, a tandem mirror neutron generator 60 providing a 25 T magnetic field in the volume 62 may provide about 0.1 T in the area of the beginning of the plate arrays 78, a field strength reduction resulting from the expanding area and separation of flux lines 30.

The plate arrays 78 communicate with power management circuitry 80 controlled by a controller 82, such as a computer, whose operation will be described below. The power management circuitry 80 provides electrical biasing for the plate arrays 78 and extracts electrical power from the plate arrays 78 for general use or operation of the energy-consuming components of the tandem mirror neutron generator 60 such as the accelerator chamber 27 or other energy-consuming devices 83 including the radiofrequency generator 20 or microwave energy input device described above for maintaining fusion temperatures.

Figure 4:
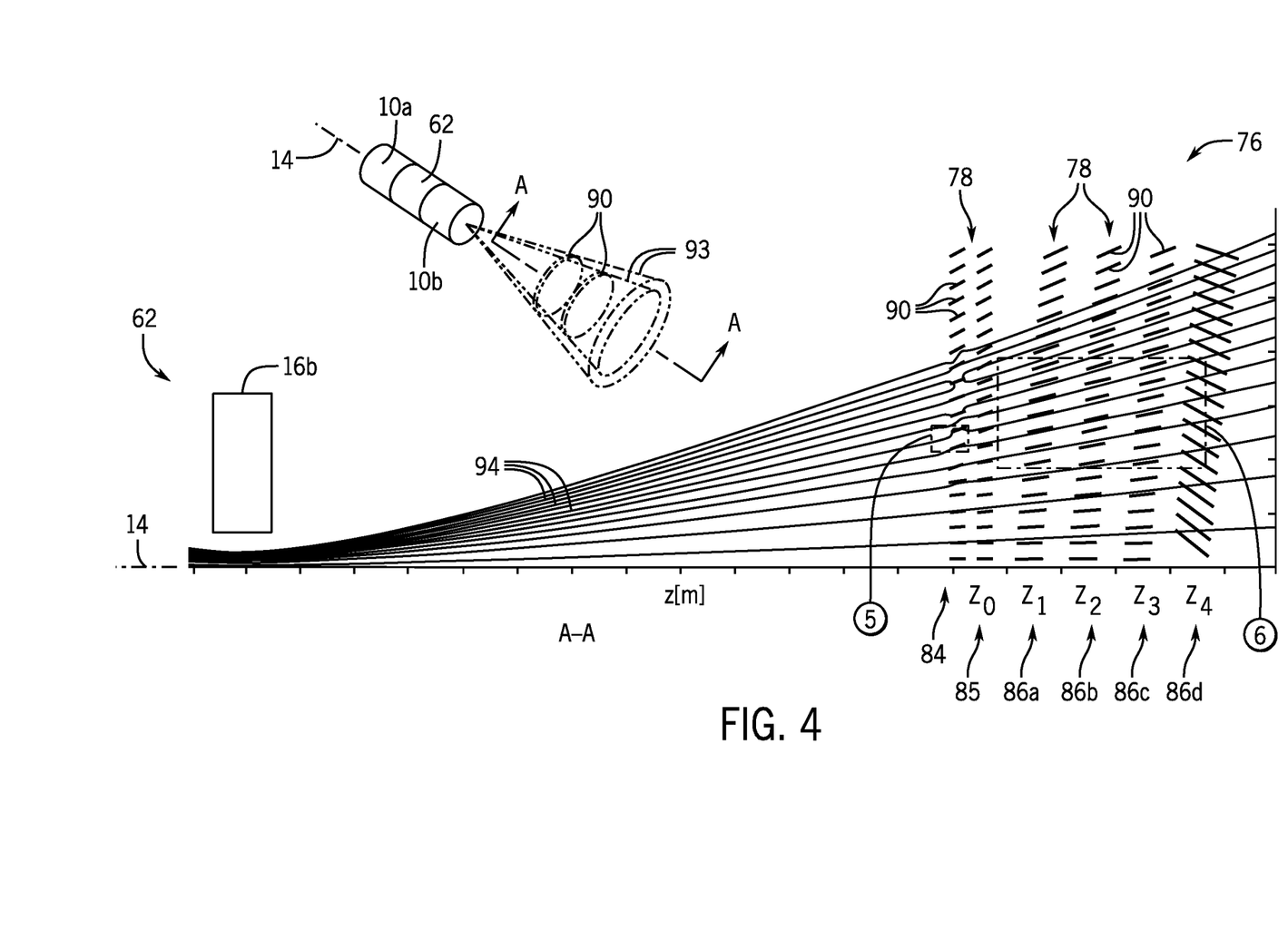
FIG. 4 is a fragmentary and simplified side elevational cross-sectional view of the electron separator and ion collector plates of the direct energy converter of FIG. 3 with an inset showing the orientation of the cross-section.

Referring now also to FIG. 4, the plate arrays 78 may include an electron separator plate array 84 closest to the generator volume 62, followed by a suppressor grid 85, and in turn followed by four ion capture plate arrays 86*a*-86*c*. Each of the plate arrays 78 may provide a set of nested concentric ring vanes 90 extending in a plane generally perpendicular to the axis 14 and each having a radially inner and outer surface conforming to the periphery of a frustrum of an imaginary cone 93 symmetric about the axis 14 and having an apex toward the volume 62 and a base removed therefrom. As the diameter of the ring vanes 90 within the plate array 78 increases, a corresponding size of the base of the imaginary cone 93 also increases so that the gap 91 between adjacent ring vanes 90 is generally aligned with a trajectory 94 of ions or electrons out of the volumes of the high-energy plasma systems 10. Generally, the trajectories 94 will desirably have a tangent between adjacent ring vanes 90 along a conical surface defining the ring vanes 90. In this way the profile of the ring vanes 90 blocking the trajectory of the electrons or ions is substantially minimized over the entire area of the plate arrays 78.

An exception to this orientation of the ring vanes 90 is the ion capture plate array 86 which may be given an angular orientation ensuring that ions or electrons along the trajectories 94 intersect at least one ring vane with no possibility of passing between them along the trajectory 94. This exception, as will be described below, better ensures that ultimately all ions are captured by at least one ion capture plate array 86.

Figure 5:
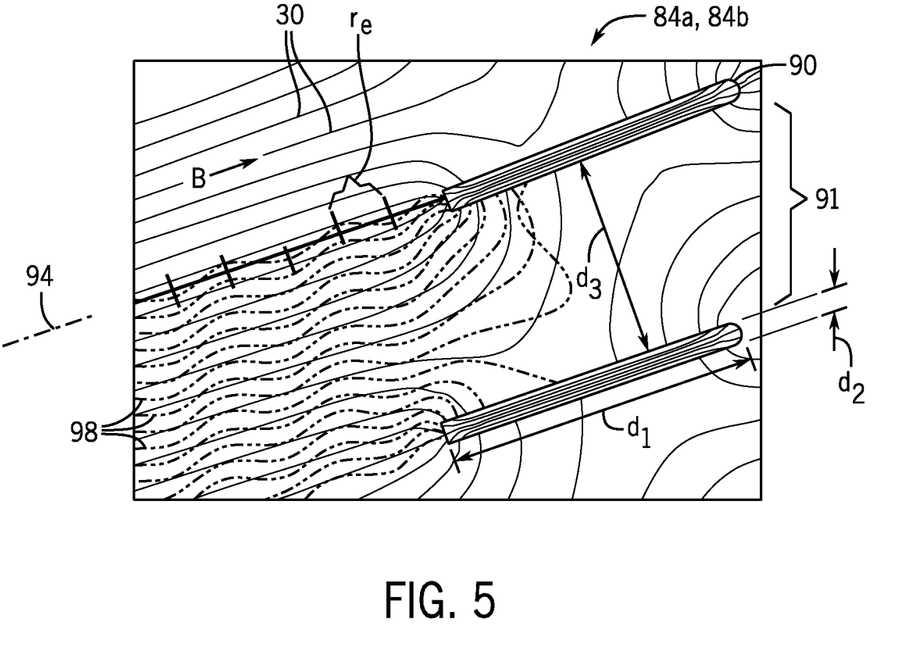
FIG. 5 is an expanded view of region 5 of FIG. 4 showing interaction of electrons with the electron separator plates.

Referring now to FIG. 5, the ring vanes 90 of the electron separator plate array 84 may be constructed of iron or other ferromagnetic material or material of high permeability μ (for example, above $2.5 \times 10^{-2}$ or preferably above $1 \times 10^{-2}$). In one embodiment, the ring vanes 90 of the electron separator plate array 84 serve to locally bend the magnetic flux lines 30 to promote a spiraling inward of electron trajectories 98 to the surfaces of the ring vanes 90. In this way, the electron separator plate array 84 may selectively intercept electrons which have a relatively small Larmor radius $r_e$ (for example, less than a centimeter) in the magnetic field 30 compared to the ions whose larger Larmor radius (typically on the order of 10 cm or more) produce a limited deviation in the trajectory 94 unlikely to promote such a collision. Typically the Larmor radius of the ions will be larger than $d_1$ (the axial length of the vane 90), for example, by a factor of two or more. The radial separation between the vanes 90, $d_3$, and radial thickness of the vanes 90, $d_2$, (the latter of which represents a blocking profile of vane 90 along the trajectories 94) can be practically such that $d_3/d_2$ is 20 or more decreasing the chance of direct ion collision between the ions and the vanes 90. This further causes the electron separator plate array 84 to primarily block electrons and not ions.

Figure 7:
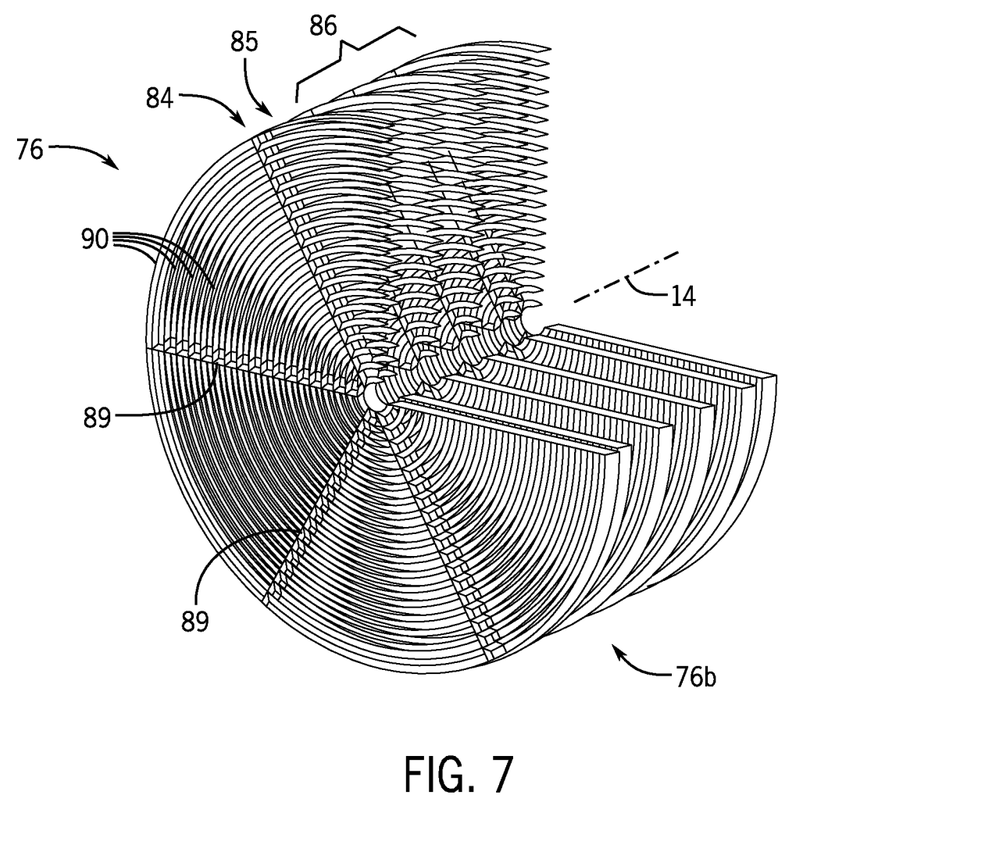
FIG. 7 is a perspective cutaway view of the electron separator plates and ion collector plates of FIGS. 4, 5, and 6.
Figure 8:
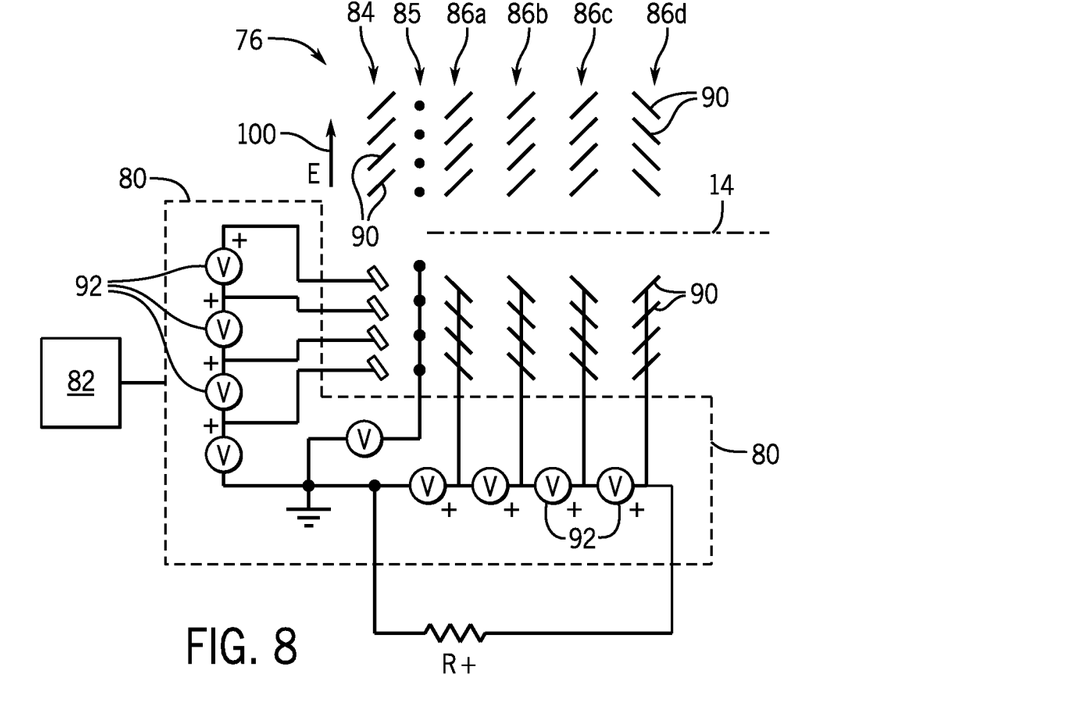
FIG. 8 is a schematic diagram of the biasing system of the electron separator plates and ion collector plates of FIG. 4.

Referring now also to FIG. 8, the successive vanes 90 of the electron separator plate array 84 may be biased at successively increasing voltages by power management circuitry 80 to establish a radially outward electrical field 100 (E), this biasing represented by a set of idealized series-connected voltage sources 92. The magnitude of this field 100 may be controlled by a controller 82 to stabilize the plasma in the volume 62 through sheared rotation described generally by Beklemishev, A. D., Bagryansky, P. A., Chaschin, M. S. & Soldatkina, E. I. (2010) Vortex Confinement of Plasmas in Symmetric Mirror Traps, Fusion Science and Technology, 57:4, 351-360, DOI: 10.13182/FST10-A9497 and Ryutov, D. D., Molvik, A. W. and Simonen, T. C. Axisymmetric Mirror as a Driver for a Fusion-Fission Hybrid: Physics Issues, J Fusion Energy 29, 548 (2010). Referring momentarily to FIG. 7, for the purpose of this biasing, each vane 90 of the electron separator plate array 84 may be supported by radially extending interconnecting insulating struts 89 passing between successive concentric vanes 90 allowing the desired electric field gradient to be sustained.

Referring still to FIGS. 4 and 8, the electron separator plate array 84 is followed by an electron suppressor grid 85 placed at a negative voltage bias with respect to the ring vanes 90 of the electron separator plate array 84. This electron suppressor grid 85 may, but need not necessarily, have vanes 90 but can be any type of grid including wires that may operate to establish an electrical field tending to repel electrons from travel past or from the electron separator plate array 84 in arcing to the closest ion capture plate array 86a. For the same purpose of reducing arcing, all electrically conducting vanes 90 may be given rounded edges to avoid high electrical field concentration at those edges.

Figure 6:
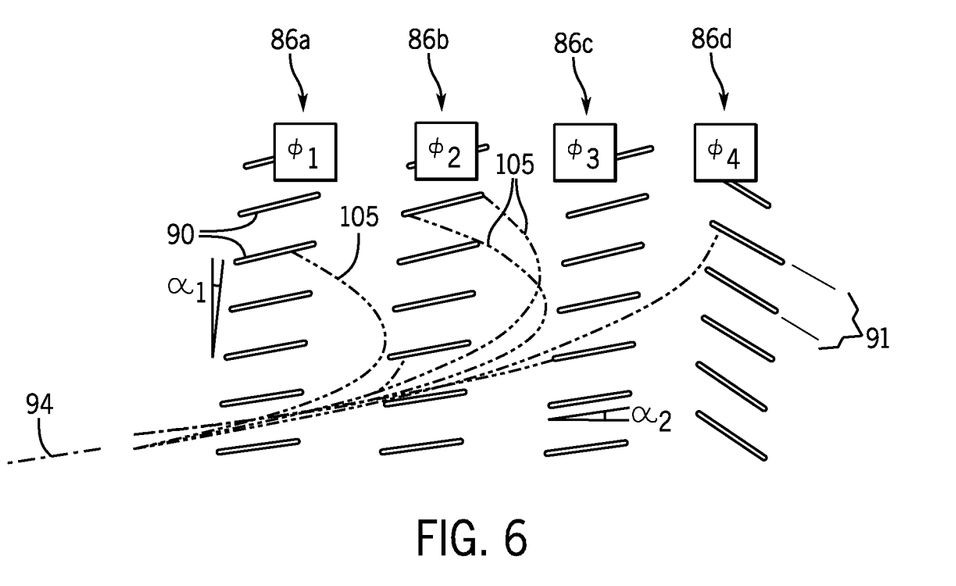
FIG. 6 is an expanded view of region 6 of FIG. 4 showing interaction of the ions with the ion collector plates.

Referring now to FIGS. 4, 6, and 8, the ion capture plate arrays 86a-86d following the electron separator plate array 84 and electron suppressor grid 85 are each given a successively higher positive voltage with respect to the baseline of the electron separator plate array 84, for example, to have a respective voltage of 88 kV, 165 kV, 270 kV. The ion capture plate arrays 86 rely on electric not magnetic fields to capture the ions and use their electrical potential to slow and capture passing ions. Ions that are not sufficiently slowed for capture by the one ion capture plate array 86 can pass through that ion capture plate array 86 to face the higher potential of the succeeding ion capture plate array 86b for potential capture at the succeeding plate array. Again the vanes 90 are angled so that the fast ions (insufficiently slowed by the potential of the instant ion capture plate array 86) may pass onward rather than strike the ion capture plate array 86 directly at high speed releasing energy disproportionately in heat rather than electrical power.

At each ion capture plate array 86, ions that are sufficiently slowed for proper capture will generally pass through the ion capture plate array 86 to be repelled by the biasing of the ion capture plate array 86 and to curve back along a recoil trajectory 105 toward the ion capture plate array 86 which they passed, but angled with respect to the trajectories 94 so that the interception profile of the vanes 90 (the area perpendicular to the path of the recoil trajectory 105 of the ions) is high, increasing the likelihood of capture. Space charge caused by the cloud of ions and their angle of incidence with respect to the repulsion of the succeeding ion capture plate array 86 tends to push the ions outwardly in this recoil trajectory 105 favorably increasing the interception profile of the vanes 90. Ions that are not captured by any of the ion capture plate arrays 86a-86c strike the ion capture plate array 86d whose vanes 90 are oriented to intercept ions along a trajectory 94 without recoil representing the final capture point for ions.

The power generated by the ion capture plate arrays 86 will be equal to the current defined by the number of captured ions at each ion capture plate array 86 times the positive potential of the particular ion capture plate array 86. This electrical power may be applied across an arbitrary load and may be desirably used to power the tandem high-energy plasma system 10' as discussed above.

Figure 9:
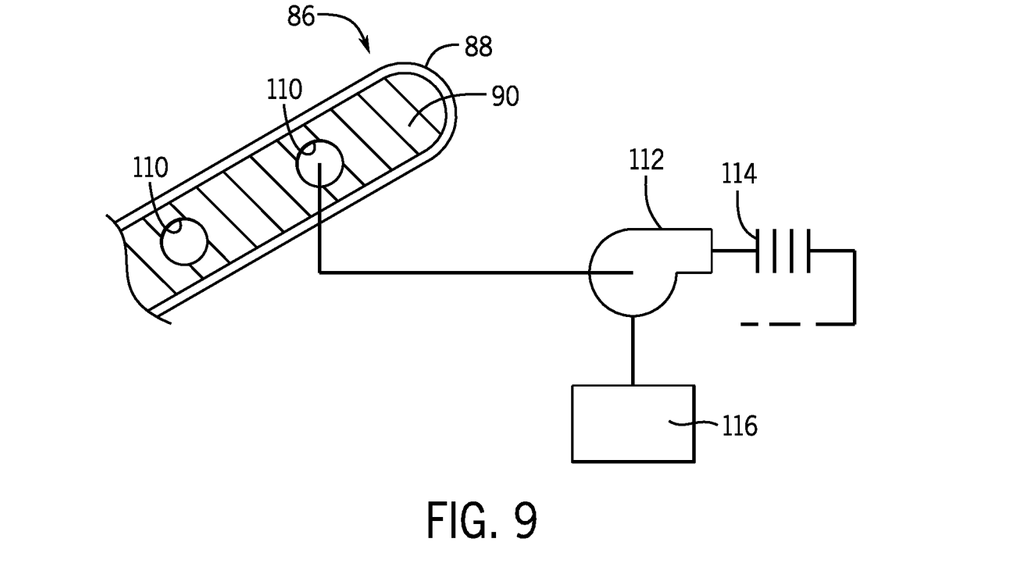
FIG. 9 is a fragmentary cross-section of an ion collector plate showing internal cooling channels and outer getter material.

As ions are captured by the successive ion capture plate arrays 86 they recombine with an electron in the metallic surface of the vanes 90 and release a neutral atom, for example, lithium fuel, that can be pumped away by a vacuum pump 106 (shown in FIG. 3). Referring now also to FIG. 9, alternatively and in addition, the outer surface (or entire) vane 90 of each ion capture plate array 86 may be coated with a getter material 88, such as tantalum, that can absorb and thus store the neutrals, preventing them from interfering with the incoming ions and/or creating an arcing problem discussed above. Generally, the getter material 88 provides an absorption of a fuel material, such as deuterium, better than that of aluminum or iron.

The vanes 90 may further provide for cooling channels 110 through which a coolant such as helium may be circulated by a pump 112 through a heat exchanger 114. Periodically the pump 112 may be stopped by a recharge controller 116, for example, implemented by controller 82, to allow the temperature of the vane 90 to increase under the impact of the ions (or by heating by means of the heat exchanger 114) to drive off the captured neutrals of deuterium for scavenging by the vacuum pump 106. More generally, the vacuum pump may provide maintenance of a neutral pressure below eight microtorr as a nonlimiting example. Unlike the vanes 90 of the electron separator plate array 84, the vanes of the ion capture plate arrays 86 are desirably not ferromagnetic but may be constructed of any electrically conducting material having good conductivity such as aluminum or the like.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion.

Such terminology may include the words specifically mentioned above, derivatives thereof, and words of similar import. Similarly, the terms "first", "second" and other such numerical terms referring to structures do not imply a sequence or order unless clearly indicated by the context. The terms "along an axis" or "axially extending" or the like are intended to describe structures whose primary or longest extent is generally aligned with but not necessarily parallel to the axis, for example within 45° of parallel.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. An apparatus for producing plasma comprising:
    a housing defining a containment volume holding the plasma;
    Helmholtz magnets positioned about the containment volume to provide a magnetic mirror generating a confinement field providing magnetic flux lines extending along an axis, the flux lines converging at opposed first and second ends of the confinement volume holding plasma;
    a fuel beam delivery system communicating with the housing for injecting fusion fuel into the confinement field; and
    a direct energy converter positioned adjacent to the housing along the axis, the direct energy converter being outside of the containment volume, the direct energy converter comprising multiple arrays of charged plates, wherein, for each of the arrays of charged plates, each of the charged plates has an annular shape extending around the axis and is spaced apart from other charged plates in the respective array in a radial direction with respect to the axis, the charged plates spaced apart from each other in the radial direction by gaps aligned with trajectories of ions escaping from the containment volume, and
    wherein the charged plates are configured to generate electrical power from the ions.

2. The apparatus of claim 1 wherein the charged plates each have a surface defining a conical frustum shape, and wherein the charged plates are nested within each other and centered about the axis, and wherein each of the charged plates is positioned such that an end of the conical frustum shape defined by the surface of the respective charged plate having a smaller diameter than an opposite end of the conical frustum shape defined by the surface of the respective charged plate is directed toward the containment volume.

3. The apparatus of claim 1 wherein at least one of the charged plates has an outer surface made of a getter material for absorption of neutrals resulting from the ions.

4. The apparatus of claim 3 wherein the getter material is tantalum.

5. The apparatus of claim 3 further including cooling channels in thermal communication with the charged plates for cooling the plates.

6. The apparatus of claim 5 further including a coolant controller for controlling a flow of coolant through the cooling channels, the coolant controller configured to control the flow of the coolant to periodically permit heating of the plates by the ions to expel the neutrals.

7. The apparatus of claim 1 further including a power system, wherein the charged plates of each of the arrays are arranged in respective planes perpendicular to the axis and the arrays are spaced apart from each other along the axis, and wherein the power system is configured to apply a voltage to the charged plates of each of the arrays such that the applied voltage increases with increasing distance from the containment volume along the axis.

8. The apparatus of claim 1 wherein the fuel beam delivery system comprises an accelerator chamber and the accelerator chamber receives the electrical power from the direct energy converter.

9. The apparatus of claim 1 further including an electron separator comprised of magnetic elements, the magnetic elements positioned between the charged plates and the containment volume along the axis, the magnetic elements spaced apart from each other in the radial direction, the magnetic elements having a radial spacing and axial lengths configured to magnetically deflect electrons into the magnetic elements.

10. The apparatus of claim 9 wherein each of the magnetic elements is ferromagnetic and magnetized by the axially extending magnetic flux lines of the confinement field.

11. The apparatus of claim 9 further including power management circuitry and wherein the magnetic elements are electrically biased by the power management circuitry with respect to the charged plates to permit current flow between the charged plates and the magnetic elements.

12. The apparatus of claim 9 further including power management circuitry and wherein the magnetic elements are electrically biased with respect to each other by a controller configured to control the power management circuitry and alter the electrical bias to provide a radially directed electric field adapted for control of the plasma.

13. The apparatus of claim 9 wherein each of the magnetic elements is a vane having a dimension along the axis at least 10 times its radial thickness.

14. The apparatus of claim 9 wherein the magnetic elements each have a surface defining a conical frustum shape, and wherein the magnetic elements are nested within each other and centered about the axis, and wherein each of the magnetic elements is positioned such that an end of the conical frustum shape defined by the surface of the respective magnetic element having a smaller diameter than an opposite end of the conical frustum shape defined by the surface of the respective magnetic element is directed toward the containment volume.

\* \* \* \* \*